United States Patent
Kwon

(10) Patent No.: US 8,682,488 B2
(45) Date of Patent: Mar. 25, 2014

(54) HUMANOID ROBOT AND WALKING CONTROL METHOD THEREOF

(75) Inventor: Woong Kwon, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 443 days.

(21) Appl. No.: 13/006,821

(22) Filed: Jan. 14, 2011

(65) Prior Publication Data

US 2011/0178636 A1    Jul. 21, 2011

(30) Foreign Application Priority Data

Jan. 18, 2010 (KR) .................. 10-2010-0004286

(51) Int. Cl.
*B25J 13/04* (2006.01)
(52) U.S. Cl.
USPC .............................................. 700/253; 901/1
(58) Field of Classification Search
USPC .................. 700/253, 245, 261, 251, 260; 318/568.2, 568.11, 568.12, 568.1, 318/568.16, 632; 901/1, 9, 46
See application file for complete search history.

(56) References Cited

U.S. PATENT DOCUMENTS

| | | | |
|---|---|---|---|
| 6,922,609 B2 * | 7/2005 | Takenaka et al. | 700/245 |
| 7,313,463 B2 * | 12/2007 | Herr et al. | 700/245 |
| 7,386,364 B2 * | 6/2008 | Mikami et al. | 700/245 |
| 2003/0144763 A1 | 7/2003 | Mori et al. | |
| 2004/0051493 A1 * | 3/2004 | Furuta et al. | 318/568.12 |

FOREIGN PATENT DOCUMENTS

| | | |
|---|---|---|
| EP | 1 393 866 A1 | 3/2004 |
| EP | 1 736 286 A1 | 12/2006 |

OTHER PUBLICATIONS

European Search Report dated May 4, 2011 in corresponding European Patent Application 11151203.4.

* cited by examiner

*Primary Examiner* — Dalena Tran
(74) *Attorney, Agent, or Firm* — Staas & Halsey LLP

(57) ABSTRACT

Disclosed herein are a humanoid robot that compensates for a zero moment point (ZMP) error during finite state machine (FSM)-based walking to achieve stable walking and a walking control method thereof. The humanoid robot compensates for a joint position trajectory command or a joint torque command using compensation values calculated based on situations divided according to the position of a calculated ZMP and the position of a measured ZMP in a stable region of the robot.

14 Claims, 11 Drawing Sheets

● CALCULATED ZMP
○ MEASURED ZMP

HUMANOID ROBOT AND WALKING CONTROL METHOD THEREOF

CROSS-REFERENCE TO RELATED APPLICATIONS

This application claims the priority benefit of Korean Patent Application No. 10-2010-0004286, filed on Jan. 18, 2010 in the Korean Intellectual Property Office, the disclosure of which is incorporated herein by reference.

BACKGROUND

1. Field

Embodiments of the disclosure relate to a humanoid robot that compensates for a zero moment point (ZMP) error during finite state machine (FSM)-based walking to achieve stable walking and a walking control method thereof.

2. Description of the Related Art

Research into a bipedal walking robot having a joint system similar to that of a human such that the robot may easily be applied to human working and living spaces has been actively conducted.

Examples of a walking control method of such a bipedalal robot include a position-based zero moment point (ZMP) walking control method, a torque-based dynamic walking control method, and a finite state machine (FSM) walking control method.

In the ZMP-based walking control method, a walking direction, a stride width, a walking rate and the like are preset, a walking pattern of feet and a body corresponding to the preset items is created using ZMP constraint conditions, and a joint position trajectory of each leg is calculated by inverse kinematic calculation of the walking pattern. Also, the ZMP-based walking control method is implemented by position servo control to enable joints of each leg to follow the calculated joint position trajectory. During walking, joints of each leg are controlled to accurately follow the joint position trajectory obtained from the walking pattern.

In the ZMP-based walking control method, the robot continues to bend its knees while walking such that kinematic singularity is avoided when calculating the angle of each joint through inverse kinematics. As a result, the robot may unnaturally walk unlike a human.

In the ZMP-based walking control method, the position of each joint may be accurately controlled to control the ZMP, and therefore, a position servo control gain is high. As a result, current of the motor is high, and therefore, energy efficiency is low. Also, rigidity of each joint is increased, and therefore, each joint may apply great impact to obstacles when colliding with the obstacles.

In the FSM-based walking control method, operation states (indicating the states of the FSM) of the walking robot are preset, and torque of each joint is calculated by referring to the operation states during walking, such that the robot walks appropriately.

In the FSM-based walking control method, the robot may take various poses by changing the operation state during walking. However, since each pose is taken in a restricted operation state, a separate operation to maintain balance of the robot is performed regardless of a walking operation to perform a task. A representative example of the balancing operation is a step motion in which the robot stamps its feet. Time is delayed and energy is wasted due to such operation.

The humanoid robot may be considered to interact with surroundings to apply FSM-based walking to the humanoid robot, such as a bipedal robot, which has difficulty in balancing as compared with a quadrupedal robot. That is, the operation state of the robot is fed back according to the surroundings to control the walking operation of the robot.

SUMMARY

It is an aspect of the embodiments to provide a humanoid robot that compensates for a zero moment point (ZMP) error during finite state machine (FSM)-based walking to achieve stable walking and a walking control method thereof.

Additional aspects will be set forth in part in the description which follows and, in part, will be obvious from the description, or may be learned by practice of the embodiments.

In accordance with one aspect, a humanoid robot includes a robot joint unit comprising joints movable during walking of the robot, a sensor unit to measure landing information and pose information of the robot, a walking pattern creation unit to calculate a joint position trajectory command or a joint torque command of each joint to perform walking of the robot according to a walking pattern of the robot, a zero moment point (ZMP) calculation unit to output a calculated ZMP of the robot calculated using a trajectory of each joint calculated by the walking pattern creation unit, a ZMP measurement unit to output a measured ZMP of the robot measured using a measurement value of the sensor unit, a compensation value calculation unit to calculate and output a compensation value to compensate for the joint position trajectory command or the joint torque command using the calculated ZMP calculated by the ZMP calculation unit and the measured ZMP measured by the ZMP measurement unit, and a compensation unit to add the compensation value calculated by the compensation value calculation unit to the joint position trajectory command or the joint torque command calculated by the walking pattern creation unit to compensate for the joint position trajectory command or the joint torque command.

The walking pattern creation unit may include a plurality of state machines alternately operating when a left foot or a right foot lands on a ground and a joint position trajectory calculator to determine landing of the left foot or the right foot according to switching between the state machines to calculate a joint position trajectory command of each joint.

The walking pattern creation unit may further include a joint torque calculator to calculate a joint torque command using the joint position trajectory command.

The joint torque calculator may calculate a joint torque command $\tau_d$ of each joint as represented by Equation 1

$$\tau_d = k_p(\theta_d - \theta) + k_d(\dot{\theta}_d - \dot{\theta}) + \tau_{ff} \quad \text{Equation 1}$$

Where, $\theta_d$ is a joint position trajectory command, $\theta$ is a current joint position fed back from an actuator such as a motor, $k_p$ is a proportional gain, $\dot{\theta}_d$ is a derivative joint position trajectory command, $\dot{\theta}$ is a derivative current joint position, $k_d$ is a derivative gain, and $\tau_{ff}$ is a feed-forward parameter previously calculated using inverse dynamics.

The ZMP calculation unit may calculate a calculated ZMP (Pxc, Pyc) from a mass model of the robot as represented by Equation 2.

$$p_{xc} = \frac{\sum_{i=1}^{N} \{m_i(\ddot{z}_i + g)x_i - m_i(z_i - p_z)\ddot{x}_i + (0, 1, 0)I_i\dot{\omega}_i\}}{\sum_{i=1}^{N} m_i(\ddot{z}_i + g)} \quad \text{Equation 2}$$

-continued $$p_{yc} = \frac{\sum_{i=1}^{N}\{m_i(\ddot{z}_i+g)y_i - m_i(z_i-p_z)\ddot{y}_i + (0,1,0)I_i\dot{\omega}_i\}}{\sum_{i=1}^{N} m_i(\ddot{z}_i+g)}$$

Where, N is the number of F/T sensors, $m_i$ is a mass of an ith link of the robot, $\ddot{x}_i$, $\ddot{y}_i$ and $\ddot{z}_i$ are accelerations of a center of gravity of the ith link of the robot in x-axis, y-axis, and z-axis directions, $I_i$ is a moment of inertia of the ith link of the robot, $\dot{\omega}_i$ is acceleration of the ith link of the robot, g is acceleration due to gravity, and (0,1,0) is a 3-by-1 matrix.

The ZMP measurement unit measures a measured ZMP (Pxm, Pym) of the robot using the measurement value of the sensor unit as represented by Equation 3.

$$p_{xm} = \frac{\sum_{i=1}^{N}\{-\tau_{iy} - (p_{iz}-p_z)f_{ix} + p_{ix}f_{iz}\}}{\sum_{i=1}^{N} f_{iz}}$$

Equation 3

$$p_{ym} = \frac{\sum_{i=1}^{N}\{\tau_{ix} - (p_{iz}-p_z)f_{iy} + p_{iy}f_{iz}\}}{\sum_{i=1}^{N} f_{iz}}$$

Where, N is the number of F/T sensors, $p_{ix}$, $p_{iy}$ and $p_{iz}$ are x-axis, y-axis and z-axis reference positions when force is measured by an ith F/T sensor, $p_z$ is a z-axis coordinate of the ZMP, $\tau_{ix}$ and $\tau_{iy}$ are x-axis and y-axis moments of the ith F/T sensor, and $f_{ix}$, $f_{iy}$ and $f_{iz}$ are x-axis, y-axis and z-axis forces of the ith F/T sensor.

The compensation value calculation unit may calculate the compensation value using the calculated ZMP and the measured ZMP and output a value obtained by taking a product of a difference between a calculated ZMP and a measured ZMP of a joint to be compensated for and a proportional gain and a value obtained by taking a product of a difference between a derivative calculated ZMP and a derivative measured ZMP and a derivative gain as the compensation value.

The compensation unit may perform compensation based on situations divided according to a position of the calculated ZMP and a position of the measured ZMP in a stable region of the robot.

In accordance with another aspect, a walking control method of a humanoid robot includes calculating a joint position trajectory command or a joint torque command of each joint to perform walking of the robot according to a walking pattern of the robot, calculating a calculated ZMP of the robot using a trajectory of each joint calculated according to the walking pattern, measuring a measured ZMP of the robot using a measurement value measured by a sensor mounted in the robot, calculating a compensation value to compensate for the joint position trajectory command or the joint torque command using the calculated ZMP and the measured ZMP, and compensating for the joint position trajectory command or the joint torque command using the compensation value.

Calculating the compensation value may include obtaining a product of a difference between a calculated ZMP and a measured ZMP of a joint to be compensated for and a proportional gain and a product of a difference between a derivative calculated ZMP and a derivative measured ZMP and a derivative gain.

Compensating for the joint position trajectory command or the joint torque command may include performing compensation based on situations divided according to a position of the calculated ZMP and a position of the measured ZMP in a stable region of the robot.

The compensation may be performed to move the measured ZMP such that the measured ZMP follows the calculated ZMP when both the calculated ZMP and the measured ZMP are located in the stable region.

The compensation may be performed to move the measured ZMP such that the measured ZMP follows the calculated ZMP when the calculated ZMP is located in the stable region and the measured ZMP is located out of the stable region.

The compensation may not be performed when the calculated ZMP is located out of the stable region and the measured ZMP is located in the stable region.

The compensation may be performed using a compensation value calculated using a boundary point of the stable region nearest the position of the calculated ZMP when both the calculated ZMP and the measured ZMP are located out of the stable region.

BRIEF DESCRIPTION OF THE DRAWINGS

These and/or other aspects will become apparent and more readily appreciated from the following description of the embodiments, taken in conjunction with the accompanying drawings of which:

FIGS. 7A to 7D are views illustrating disagreement between a calculated zero moment point (ZMP) and a measured ZMP according to an embodiment, wherein FIG. 7A illustrates that both the calculated ZMP and the measured ZMP are located in a stable region, FIG. 7B illustrates that the calculated ZMP is located in the stable region and the measured ZMP is located out of the stable region, FIG. 7C illustrates that the calculated ZMP is located out of the stable region and the measured ZMP is located in the stable region, and FIG. 7D illustrates that both the calculated ZMP and the measured ZMP are located out of the stable region.

DETAILED DESCRIPTION

Figure 1:
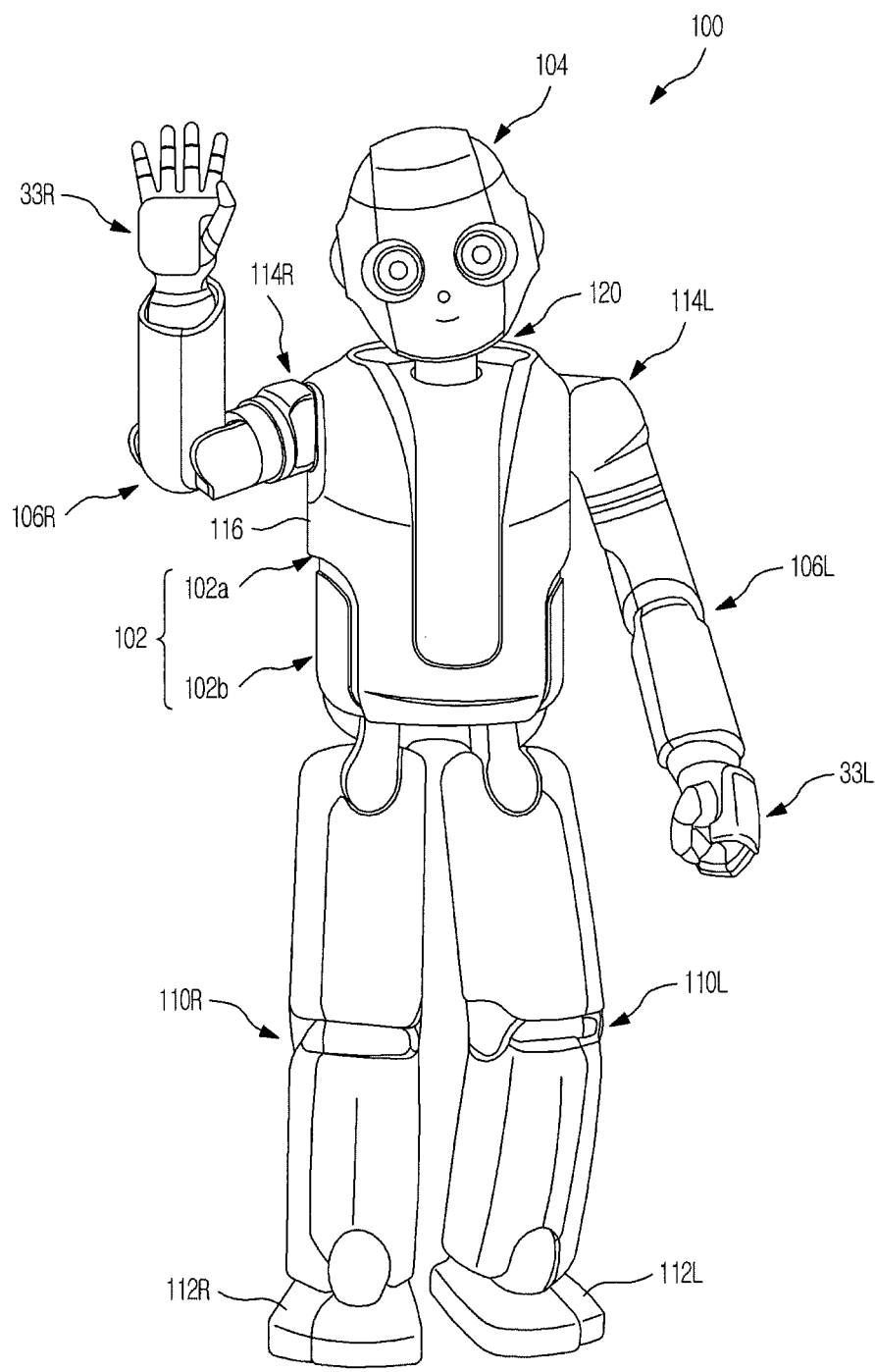
FIG. 1 is a view illustrating the external appearance of a humanoid robot according to an embodiment.

Reference will now be made in detail to the embodiments, examples of which are illustrated in the accompanying drawings, wherein like reference numerals refer to like elements throughout.

As shown in FIG. 1, a head 104 is connected to the upper part of an upper body 102 of a humanoid robot 100 via a neck 120. Two arms 106L and 106R are connected to opposite sides of the upper part of the upper body 102 via shoulders 114L and 114R, respectively. Hands 33L and 33R are connected to respective ends of the arms 106L and 106R. Two legs 110L and 110R are connected to opposite sides of the lower part of the upper body 102, respectively. Feet 112L and 112R are connected to respective ends of the legs 110L and 110R.

The head 104, the arms 106L and 106R, the legs 110L and 110R, the hands 33L and 33R, and the feet 112L and 112R have predetermined degrees of freedom through respective joints. The interior of the upper body 102 is protected by a cover 116. In reference numerals, "R" and "L" denote the right and left of the robot 100, respectively.

Figure 2:
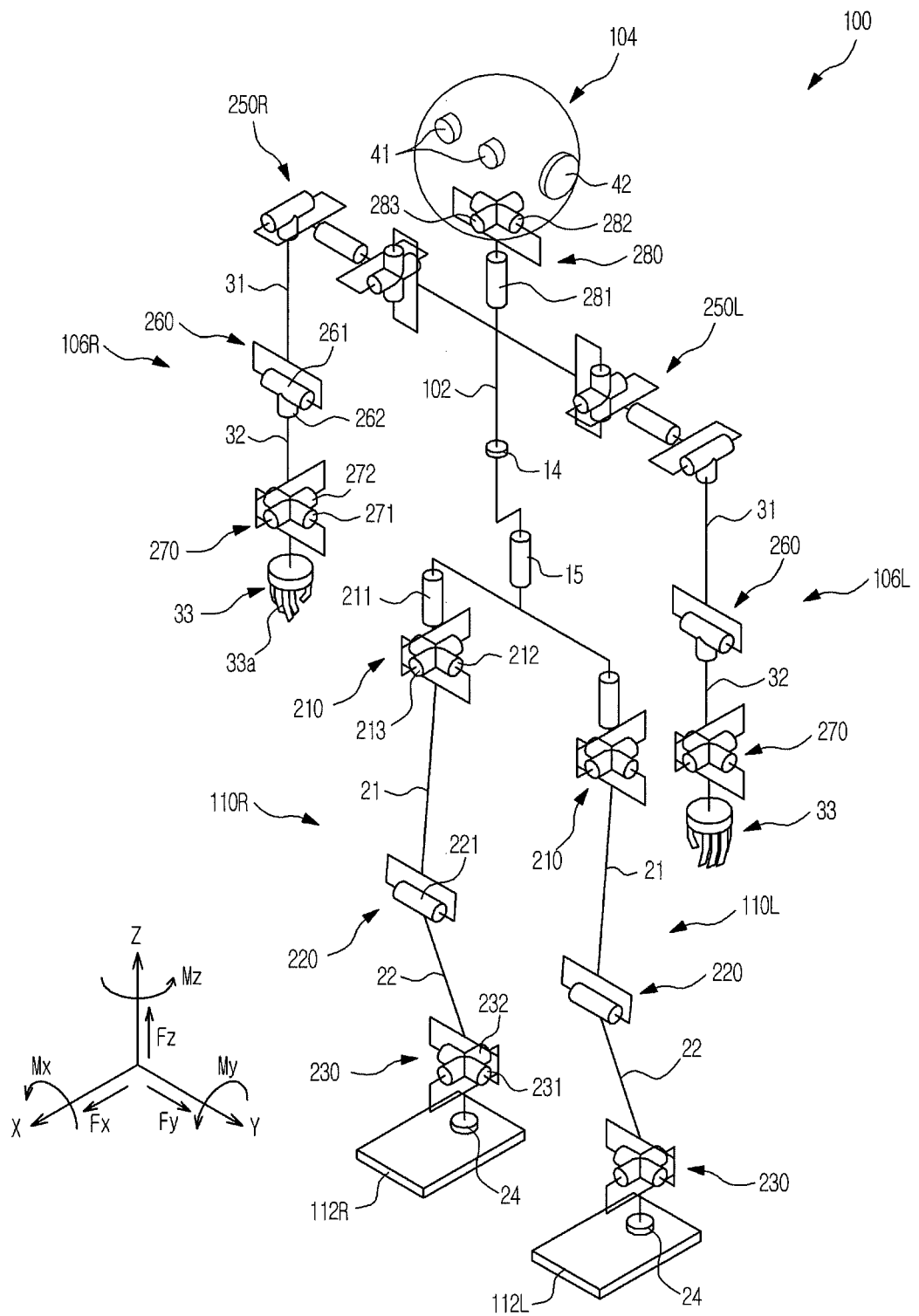
FIG. 2 is a view illustrating a joint structure of the humanoid robot of FIG. 1.

FIG. 2 is a view illustrating a joint structure of the humanoid robot shown in FIG. 1. As shown in FIG. 2, each of the legs 110L and 110R of the humanoid robot 100 has a thighbone link 21, a fibula link 22, and a corresponding one of the feet 112L and 112R. The thighbone link 21 is connected to the upper body 102 via a hip joint unit 210. The thighbone link 21 and the fibula link 22 are connected to each other via a knee joint unit 220, and the fibula link 22 and the foot 112L or 112R are connected to each other through an ankle joint unit 230.

The hip joint unit 210 may have three degrees of freedom. Specifically, the hip joint unit 210 includes a rotation joint 211 of a yaw direction (Z-axis rotation), a rotation joint 212 of a pitch direction (Y-axis rotation), and a rotation joint 213 of a roll direction (X-axis rotation).

The knee joint unit 220 includes a rotation joint 221 of a pitch direction. That is, the knee joint unit 220 may have one degree of freedom. The ankle joint unit 230 includes a rotation joint 231 of a pitch direction and a rotation joint 232 of a roll direction. That is, the ankle joint unit 230 may have two degrees of freedom.

Each of the legs 110L and 110R may include six rotation joints with respect to three joint units 210, 220 and 230. Consequently, the two legs 110L and 110R include a total of 12 rotation joints.

A multi-axis force and torque (F/T) sensor 24 is mounted between the foot 112L or 112R and the ankle joint unit 230 of each of the legs 110L and 110R. The multi-axis F/T sensor 24 measures three-directional components Fx, Fy and Fz of force transferred from the foot 112L or 112R and three-directional components Mx, My and Mz of moment so as to detect landing of the foot 112L or 112R and load applied to the foot 112L or 112R.

Cameras 41 to photograph surroundings and a microphone 42 to receive user voice are mounted in the head 104.

The head 104 is connected to the upper body 102 via a neck joint unit 280. The neck joint unit 280 includes a rotation joint 281 of a yaw direction, a rotation joint 282 of a pitch direction, and a rotation joint 283 of a roll direction. That is, the neck joint unit 280 may have three degrees of freedom.

Head rotation motors (not shown) are connected to the rotation joints 281, 282 and 283 of the neck joint unit 280.

Shoulder joint assemblies 250L and 250R are mounted to opposite sides of the upper body 102 so as to connect the arms 106L and 106R to the upper body 102.

Each of the arms 106L and 106R may have a humerus link 31, a forearm bone link 32, and a hand 33. The humerus link 31 is connected to the upper body 102 via the shoulder joint assemblies 250L or 250R. The humerus link 31 and the forearm bone link 32 are connected to each other via an elbow joint unit 260, and the forearm bone link 32 and the hand 33 are connected to each other link a wrist joint unit 270.

The elbow joint unit 260 includes a rotation joint 261 of a pitch direction and a rotation joint 262 of a yaw direction. That is, the elbow joint unit 260 may have two degrees of freedom. The wrist joint unit 270 includes a rotation joint 271 of a pitch direction and a rotation joint 272 of a roll direction. That is, the wrist joint unit 270 may have two degrees of freedom.

The hand 33 includes five fingers 33a. A plurality of joints (not shown) driven by motors may be provided in the hand 33. The five fingers 33a perform various operations such as grasping an object or indication of a specific direction in interlock with motion of the arm 106.

A pose sensor 14 is mounted in the upper body 14. The pose sensor 14 senses an inclination angle of the upper body 102 relative to a perpendicular axis and an angular speed of the upper body 102 to create pose information. The pose sensor 14 may be mounted in the head 104 in addition to the upper body 102. Also, a rotation joint 15 of a yaw direction is mounted between a chest 102a and a waist 102b constituting the upper body 102 such that the chest 102a rotates relative to the waist 102b.

Although not shown, actuators, such as motors, to drive the rotation joints are mounted in the humanoid robot 100. The motors are adequately controlled to perform various operations of the humanoid robot 100.

Figure 3:
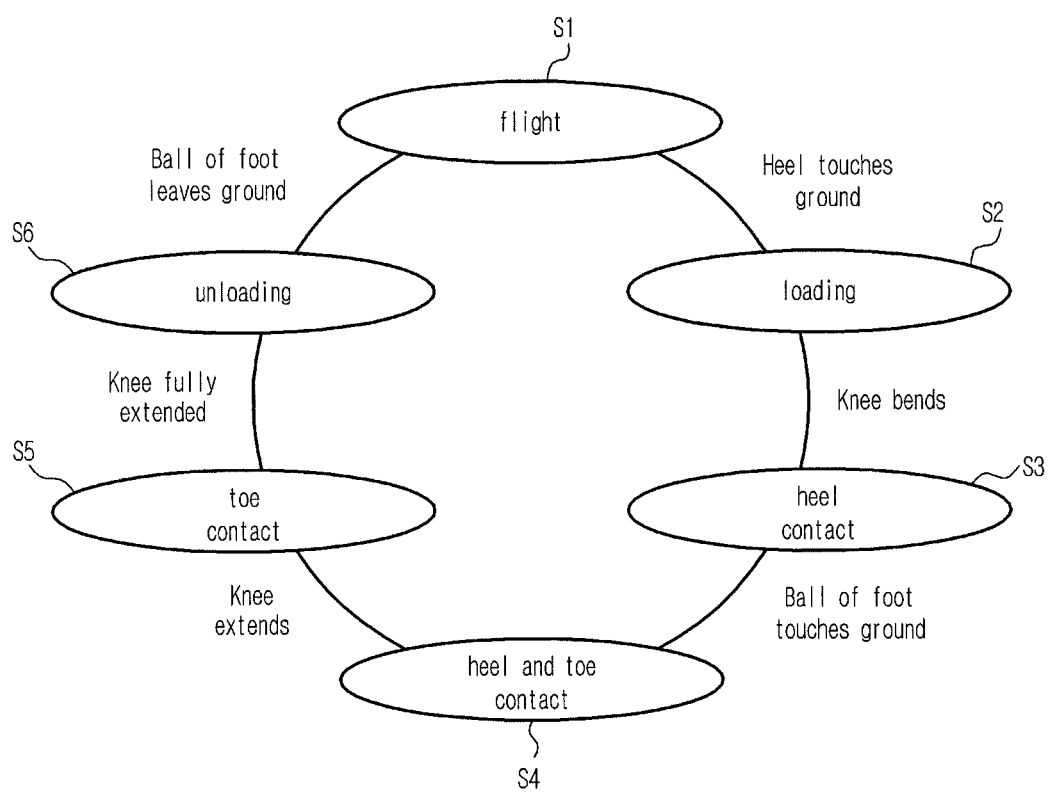
FIG. 3 is a view illustrating a robot operation state and control operation applied during finite state machine (FSM)-based walking according to an embodiment.

In a finite state machine (FSM)-based walking control method, the robot may have six predetermined operation states S1, S2, S3, S4, S5 and S6, as shown in FIG. 3. The respective operation states refer to poses which the robot assumes during walking.

The first operation state S1 (flight) denotes a pose in which one leg swings, the second operation state S2 (loading) denotes a pose in which one foot is placed down on the ground, the third operation state S3 (heel contact) denotes a pose in which the heel of one foot touches the ground, the fourth operation state S4 (heel and toe contact) denotes a pose in which the heel and the toe of one foot simultaneously touch the ground, the fifth state S5 (toe contact) denotes a pose in which the toe of one foot touches the ground, and the sixth operation state S6 (unloading) denotes a pose in which one foot is taken off the ground.

Figure 4:
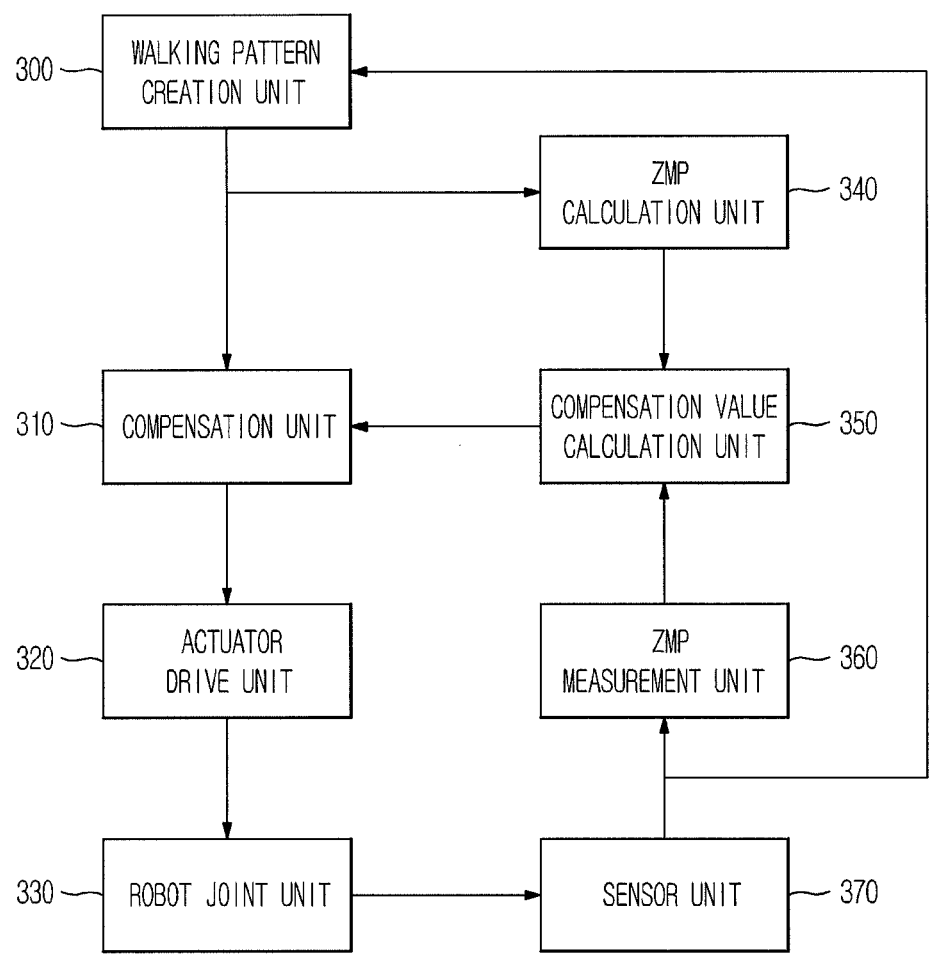
FIG. 4 is a control block diagram of a humanoid robot according to an embodiment.
Figure 5:
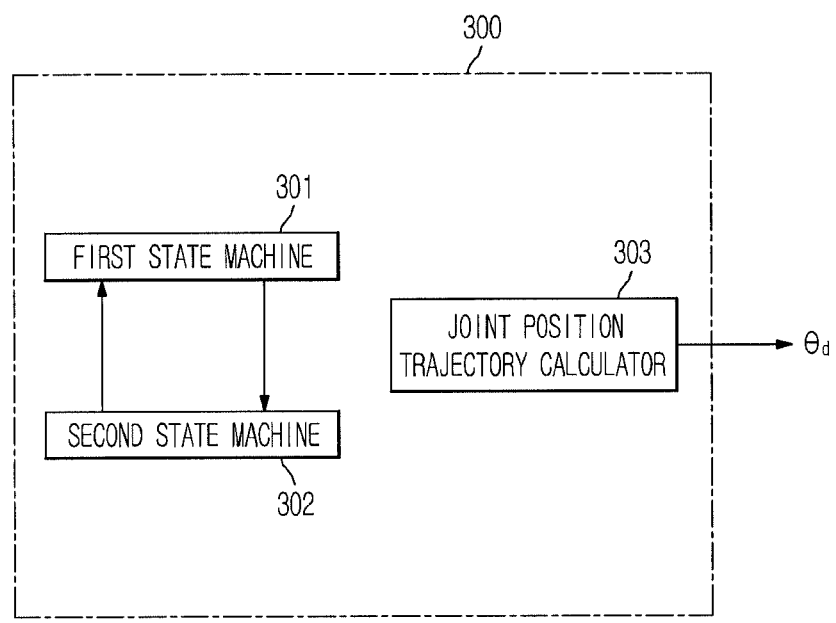
FIG. 5 is a detailed construction view of a walking pattern creation unit of FIG. 4 to output a joint position trajectory command.
Figure 6:
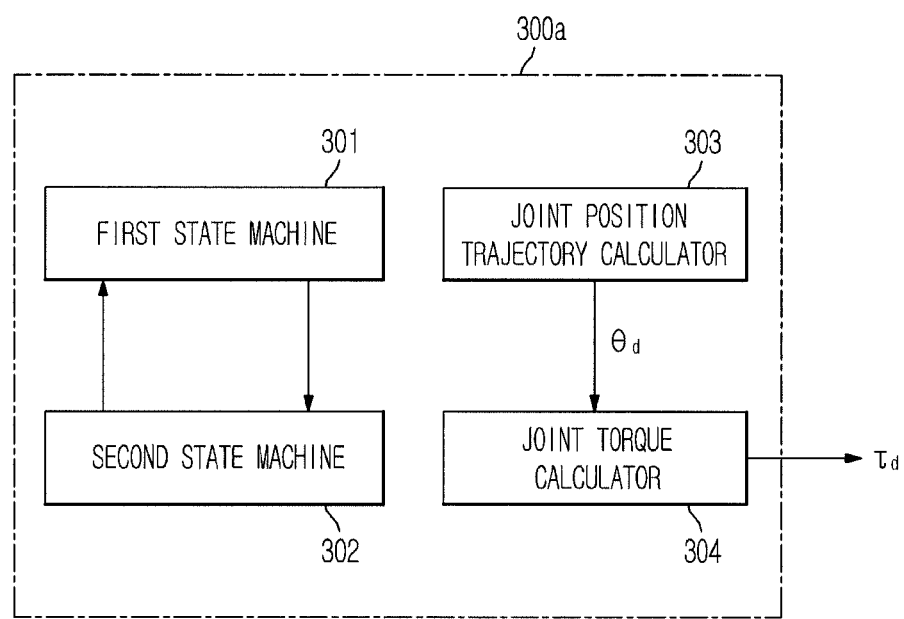
FIG. 6 is a detailed construction view of the walking pattern creation unit of FIG. 4 to output a joint torque command using the joint position trajectory command.

FIG. 4 is a control block diagram of a humanoid robot according to an embodiment, FIG. 5 is a detailed construction view of a walking pattern creation unit of FIG. 4 to output a joint position trajectory command, and FIG. 6 is a detailed construction view of the walking pattern creation unit of FIG. 4 to output a joint torque command using the joint position trajectory command.

As shown in FIG. 4, a humanoid robot 100 includes a walking pattern creation unit 300, a compensation unit 310, an actuator drive unit 320, a robot joint unit 330, a ZMP calculation unit 340, a compensation value calculation unit 350, a ZMP measurement unit 360, and a sensor unit 370.

The robot joint unit 330 may include a total of 12 rotation joints constituting hip joint units 210, knee joint units 220, and ankle joint units 230 of two legs 110L and 110R for robot walking. The robot joint unit 330 may not include joints belonging to two legs but may include all joints of the humanoid robot 100 including an upper body and arms for stable walking.

The sensor unit 370 may include a pose sensor 14 mounted in the upper body 102 to measure pose information of the robot, a multi-axis F/T sensor 24 mounted to each of the ankle joint units 230 to measure landing information of the robot, and an encoder (not shown) to measure rotation of an actuator, such as a motor, mounted to each joint of the robot joint unit 330.

The walking pattern creation unit 300 creates a walking pattern of the robot defining walking trajectory of each leg according to the pose of the robot. At this time, a joint position trajectory command may be calculated such that each joint is moved to perform walking of the robot according to the walking pattern. A walking pattern creation unit 300 of FIG. 5 is provided as such an example.

In FIG. 5, the walking pattern creation unit 300 includes a first state machine 301, a second state machine 302, and a joint position trajectory calculator 303.

The first state machine 301 and the second state machine 302 alternately operate according to a landing signal of the F/T sensor 24 mounted to the ankle joint unit 230 when the right foot or the left foot lands on the ground. When the left foot swings while the right foot is in a landing state, switching is performed from the second state machine 302 to the first state machine 301. When the right foot swings while the left foot is in the landing state, switching is performed from the first state machine 301 to the second state machine 302.

The joint position trajectory calculator 303 determines landing of the left foot and the right foot according switching between the first state machine 301 and the second state machine 302 to calculate a joint position trajectory command $\theta_d$ of each joint of the robot joint unit 330.

As another example to create the joint position trajectory command $\theta_d$, motion of a human may be captured, and motion of each joint may be sampled in a cycle, and joint positions of the humanoid robot are matched based on the sampling information to calculate the joint position trajectory command.

The walking pattern creation unit 300 may create a joint torque command using the joint position trajectory command of each joint such that each joint is moved according to the walking pattern. A walking pattern creation unit 300a of FIG. 6 is provided as such an example. As compared with FIG. 5, a joint torque calculator 304 is further included.

In FIG. 6, the joint position trajectory calculator 303 determines landing of the left foot and the right foot according to switching between the first state machine 301 and the second state machine 302 to calculate a joint position trajectory command $\theta_d$ of each joint of the robot joint unit 330 and outputs the calculated joint position trajectory command to the joint torque calculator 304.

The joint torque calculator 304 calculates a joint torque command $\tau_d$ of each joint using the joint position trajectory command $\theta_d$ of each joint as represented by Equation 1.

$$\tau_d = k_p(\theta_d - \theta) + k_d(\dot{\theta}_d - \dot{\theta}) + \tau_{ff} \quad \text{Equation 1}$$

Where, $\theta_d$ is a joint position trajectory command, $\theta$ is a current joint position fed back from an actuator such as a motor, $k_p$ is a proportional gain, $\dot{\theta}_d$ is a derivative joint position trajectory command, $\dot{\theta}$ is a derivative current joint position, $k_d$ is a derivative gain, and $\tau_{ff}$ is a feed-forward parameter previously calculated using inverse dynamics.

Equation 1 uses a proportional derivative (PD) controller and a feed-forward (FF) controller, to which, however, Equation 1 is limited. Equation 1 may use any controllers to control a joint position $\theta$ of each joint to follow a joint position trajectory command $\theta_d$. In Equation 1, the proportional gain, derivative gain, and the feed-forward parameter may be obtained through repetitive tuning for stable walking.

The compensation unit 310 adds a joint position trajectory compensation value calculated by the compensation value calculation unit 350 to the joint position trajectory command of each joint provided from the walking pattern creation unit 300 to perform compensation and provides the compensated joint position trajectory command to the actuator drive unit 320. Upon receiving the compensated joint position trajectory command from the compensation unit 310, the actuator drive unit 320 drives the actuator, such as the motor, mounted to each joint of the robot joint unit 330 such that the actuator follows the joint position trajectory command.

Upon receiving a joint torque command from the walking pattern creation unit 300a of FIG. 6, the compensation unit 310 adds a joint torque compensation value calculated by the compensation value calculation unit 350 to the joint torque command to perform compensation and provides the compensated joint torque command to the actuator drive unit 320. Upon receiving the compensated joint torque command from the compensation unit 310, the actuator drive unit 320 drives the actuator, such as the motor, mounted to each joint of the robot joint unit 330 such that the actuator follows the joint torque command.

In this way, each joint of the robot joint unit 330 is moved by the actuator drive unit 320 to perform a walking operation.

When the robot walks after pose change, walking control may be improperly performed depending upon surrounding conditions, such as the state of walking surface and the appearance of an obstacle, with the result that the robot may lose balance. The compensation unit 310 may properly compensate for the joint position trajectory command or the joint torque command to secure stable walking.

The compensation for the joint position trajectory command or the joint torque command is decided by a compensation value provided from the compensation value calculation unit 350. The compensation value calculation unit 350 calculates a compensation value using a calculated ZMP provided from the ZMP calculation unit 340 and a measured ZMP provided from the ZMP measurement unit 360.

In FIG. 4, the ZMP calculation unit 340 calculates a calculated ZMP (Pxc, Pyc) from a mass model of the robot as represented by Equation 2.

$$p_{xc} = \frac{\sum_{i=1}^{N}\{m_i(\ddot{z}_i + g)x_i - m_i(z_i - p_z)\ddot{x}_i + (0, 1, 0)I_i\dot{\omega}_i\}}{\sum_{i=1}^{N} m_i(\ddot{z}_i + g)} \quad \text{Equation 2}$$

$$p_{yc} = \frac{\sum_{i=1}^{N}\{m_i(\ddot{z}_i + g)y_i - m_i(z_i - p_z)\ddot{y}_i + (0, 1, 0)I_i\dot{\omega}_i\}}{\sum_{i=1}^{N} m_i(\ddot{z}_i + g)}$$

Where, N is the number of F/T sensors, $m_i$ is the mass of an $i^{th}$ link of the robot, $\ddot{x}_i$, $\ddot{y}_i$ and $\ddot{z}_i$ are accelerations of the center of gravity of the $i^{th}$ link of the robot in x-axis, y-axis, and z-axis directions, $I_i$ is a moment of inertia of the $i^{th}$ link of the robot, $\dot{\omega}_i$ is acceleration of the $i^{th}$ link of the robot, g is acceleration due to gravity, and (0,1,0) is a 3-by-1 matrix.

The ZMP measurement unit 360 measures a measured ZMP (Pxm, Pym) of the robot using a measurement value of the sensor unit 370 as represented by Equation 3.

$$p_{xm} = \frac{\sum_{i=1}^{N}\{-\tau_{iy} - (p_{iz} - p_z)f_{ix} + p_{ix}f_{iz}\}}{\sum_{i=1}^{N} f_{iz}} \quad \text{Equation 3}$$

$$p_{ym} = \frac{\sum_{i=1}^{N} \{\tau_{ix} - (p_{iz} - p_z)f_{iy} + p_{iy}f_{iz}\}}{\sum_{i=1}^{N} f_{iz}}$$

Where, N is the number of F/T sensors, $p_{ix}$, $p_{iy}$ and $p_{iz}$ are x-axis, y-axis and z-axis reference positions when force is measured by an $i^{th}$ F/T sensor, $p_z$ is a z-axis coordinate of the ZMP, $\tau_{ix}$ and are x-axis and y-axis moments of the $i^{th}$ F/T sensor, and $f_{ix}$, $f_{iy}$ and $f_{iz}$ are x-axis, y-axis and z-axis forces of the $i^{th}$ F/T sensor.

The calculated ZMP calculated by the ZMP calculation unit 340 is a value obtained from the trajectory of each joint provided from the walking pattern creation unit 300, which is a theoretical value of the robot. The measured ZMP measured by the ZMP measurement unit 360 is an actual value of the robot.

The position of the calculated ZMP does not coincide with the position of the measured ZMP in a single support state of the robot, with the result that four ZMP errors may occur as shown in FIGS. 7A to 7D. The same may be applied in a double support state of the robot.

In FIGS. 7A to 7D, reference numeral 401 indicates the bottom of a foot, and reference numeral 402 indicates a stable region.

Figure 7A:
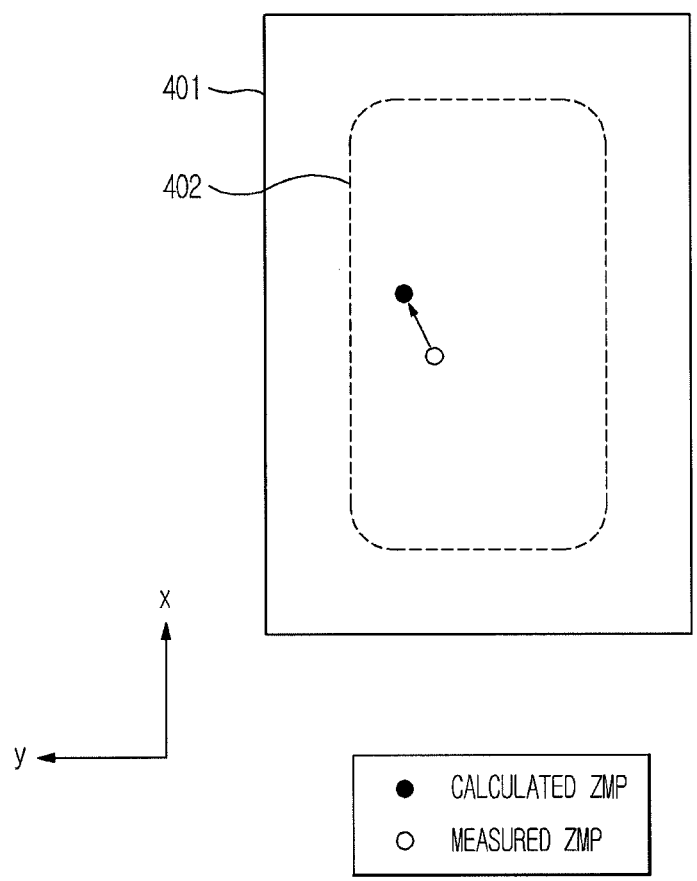

During walking of the robot, both the calculated ZMP and the measured ZMP may be located in the stable region 402, as shown in FIG. 7A. At this time, the robot may not perform a balancing operation. However, the compensation value calculation unit 350 calculates and provides a compensation value to the compensation unit 310 such that the measured ZMP ○ follows the calculated ZMP ● considering the occurrence of a situation of FIG. 7B or 7C. At this time, the compensation value calculation unit 350 calculates a compensation value with respect to a pitch-direction rotation joint 231 and a roll-direction rotation joint 232 of the ankle joint unit 230. However, the number of joints to be compensated for is not restricted. All joints of the robot joint unit 330 may be included for stable walking.

The compensation value calculation unit 350 calculates a compensation value using the calculated ZMP and the measured ZMP. For example, a compensation value of an x-axis coordinate of a joint to be compensated for may be a value $k_{px}(p_{xc}-p_{xm})$ obtained by taking the product of a difference between the calculated ZMP and the measured ZMP and a proportional gain $k_{px}$ and a value $k_{px}(p_{xc}-p_{xm})$ obtained by taking the product of a difference between a derivative calculated ZMP and a derivative measured ZMP and a derivative gain $k_{dx}$.

Upon receiving the compensation value from the compensation value calculation unit 350, the compensation unit 310 compensates for a joint position trajectory command using the compensation value.

For example, a compensated joint position trajectory command $\theta_d$ may be represented by Equation 4.

$$\theta_d = \theta_{d0} + k_{px}(p_{xc}-p_{xm}) + k_{dx}(\dot{p}_{xc}-\dot{p}_{xm}) \quad \text{Equation 4}$$

Where, $\theta_{d0}$ is an original joint position trajectory command, and $k_{px}(p_{xc}-p_{xm})$ and $k_{dx}(\dot{p}_{xc}-\dot{p}_{xm})$ are compensation values provided from the compensation value calculation unit 350.

The actuator drive unit 320 drives the actuator mounted to each joint of the robot joint unit 330 according to the joint position trajectory command compensated for by the compensation unit 310. As shown in FIG. 7A, therefore, the measured ZMP ○ moves in an arrow direction to follow the calculated ZMP ●.

Meanwhile, upon receiving a joint torque command from the walking pattern creation unit 300a of FIG. 6, the compensation unit 310 adds a compensation value calculated by the compensation value calculation unit 350 to the joint torque command to perform compensation and provides the compensated joint torque command to the actuator drive unit 320.

For example, a compensated joint torque command $\tau_d$ may be represented by Equation 5.

$$\tau_d = \tau_{d0} + k'_{px}(p_{xc}-p_{xm}) + k'_{dx}(\dot{p}_{xc}-\dot{p}_{xm}) \quad \text{Equation 5}$$

Where, $\tau_{d0}$ is an original joint torque command, $k'_{px}(p_{xc}-p_{xm})$ and $k'_{dx}(\dot{p}_{xc}-\dot{p}_{xm})$ are compensation values provided from the compensation value calculation unit 350, $k'_{px}$ is a proportional gain, and $k'_{dx}$ is a derivative gain.

The actuator drive unit 320 drives the actuator mounted to each joint of the robot joint unit 330 such that the actuator follows the joint torque command compensated for by the compensation unit 310. As shown in FIG. 7A, therefore, the measured ZMP ○ moves in the arrow direction to follow the calculated ZMP ●.

Figure 7B:
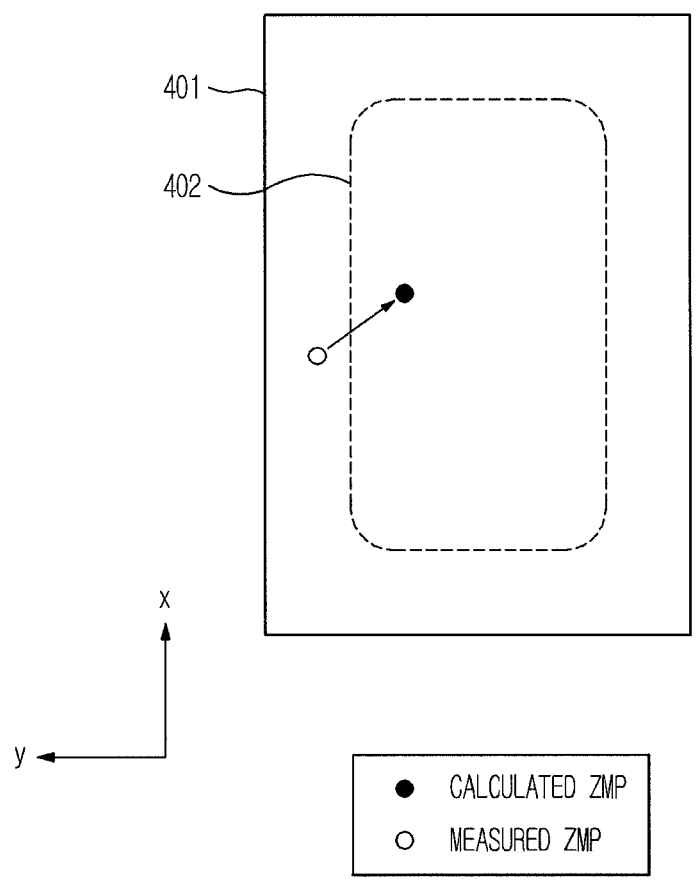

During walking of the robot, the calculated ZMP may be located in the stable region 402 and the measured ZMP may be located out of the stable region 402, as shown in FIG. 7B. This means that the robot is stable based on criteria according to the walking pattern of the robot but, in actuality, the robot is unstable due to floor conditions of a walking surface, a modeling error, a control error, etc. In this case, the compensation value calculation unit 350 provides compensation values $k_{px}(p_{xc}-p_{xm})$ and $k_{dx}(\dot{p}_{xc}-\dot{p}_{xm})$ to be applied to Equation 4 or compensation values $k'_{px}(p_{xc}-p_{xm})$ and $k'_{dx}(\dot{p}_{xc}-\dot{p}_{xm})$ to be applied to Equation 5 to the compensation unit 310. The compensation unit 310 compensates for a joint position trajectory command or a joint torque command using the compensation values.

The compensation unit 310 provides the compensated joint position trajectory command or the compensated joint torque command to the actuator drive unit 320. The actuator drive unit 320 drives the actuator mounted to each joint of the robot joint unit 330 such that the actuator follows the compensated joint position trajectory command or the compensated joint torque command. As shown in FIG. 7B, therefore, the measured ZMP ○, which is located out of the stable region 402, moves in an arrow direction to follow the calculated ZMP ●, which is located in the stable region 402.

Figure 7C:
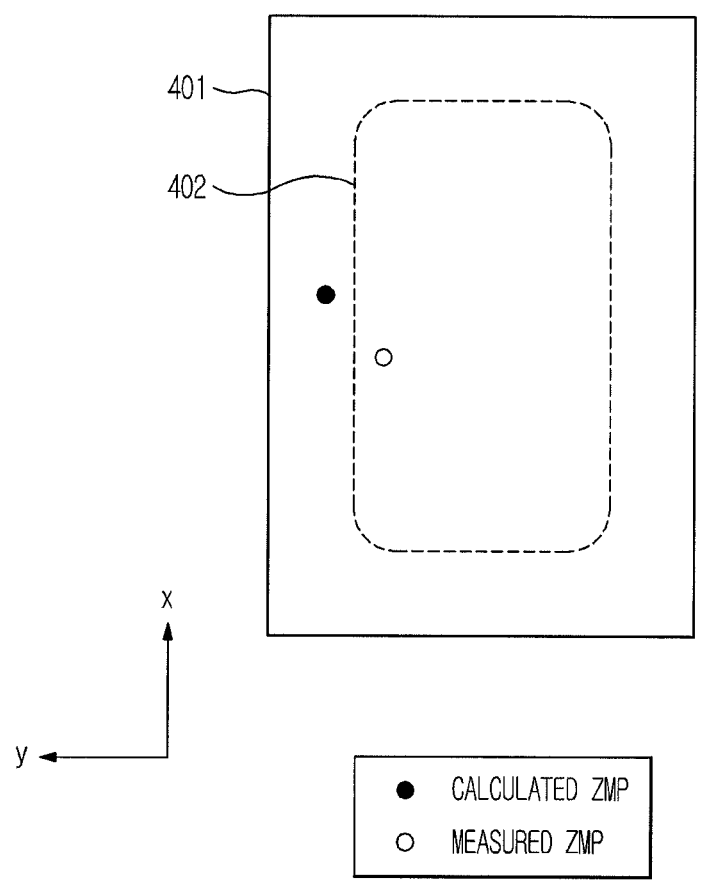

During walking of the robot, the calculated ZMP may be located out of the stable region 402 and the measured ZMP may be located in the stable region 402, as shown in FIG. 7C. This means that the robot is unstable based on criteria according to the walking pattern of the robot but, in actuality, the robot is stable. In this case, compensation using a compensation value is not performed to balance the robot.

Figure 7D:
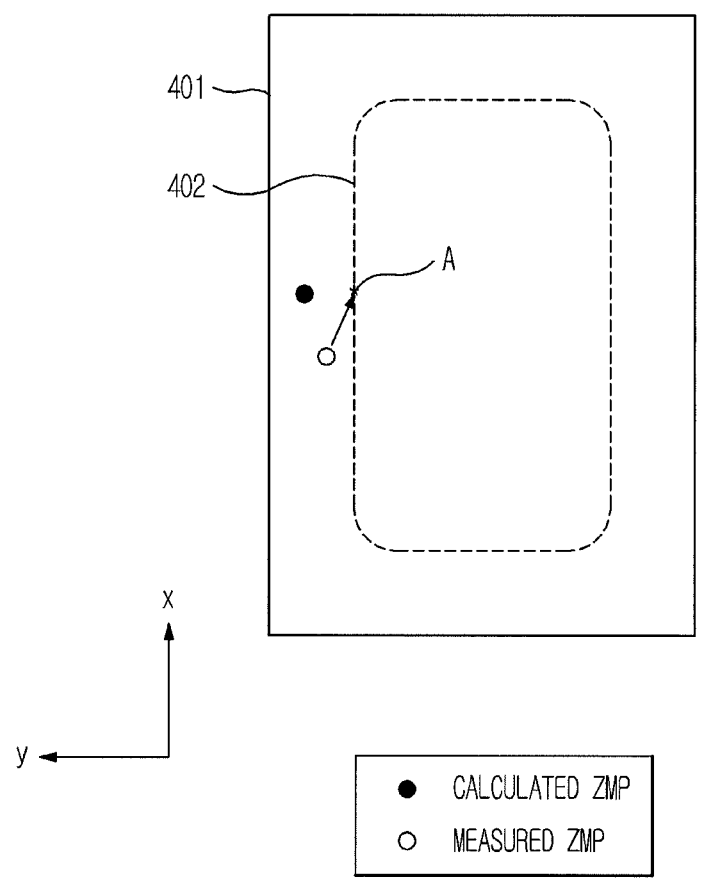

During walking of the robot, both the calculated ZMP and the measured ZMP may be located out of the stable region 402, as shown in FIG. 7D. In this case, a stable state is not secured although the measured ZMP follows the calculated ZMP, since the calculated ZMP is located out of the stable region 402. At this time, compensation may be performed to locate the measured ZMP in the stable region 402. To this end, a compensation value is calculated using a boundary point A of the stable region 402 nearest the position of the calculated ZMP ●. That is, the ZMP calculation unit 340 calculates a calculated ZMP(Pxc, Pyc) using Equation 2 based on the boundary point A, not the joint trajectory according to the walking pattern. The calculated ZMP obtained based on the boundary point A is provided to the compensation value calculation unit 350, thereby obtaining an appropriate compensation value.

The compensation unit 310 compensates for a joint position trajectory command or a joint torque command using the compensation value obtained using the boundary point A and provides the compensated joint position trajectory command or the compensated joint torque command to the actuator drive unit 320. The actuator drive unit 320 drives the actuator mounted to each joint of the robot joint unit 330 such that the actuator follows the compensated joint position trajectory command or the compensated joint torque command. As shown in FIG. 7D, therefore, the measured ZMP ○, which is located out of the stable region 402, moves in an arrow direction such that the measured ZMP ○ is located in the stable region 402.

Figure 8:
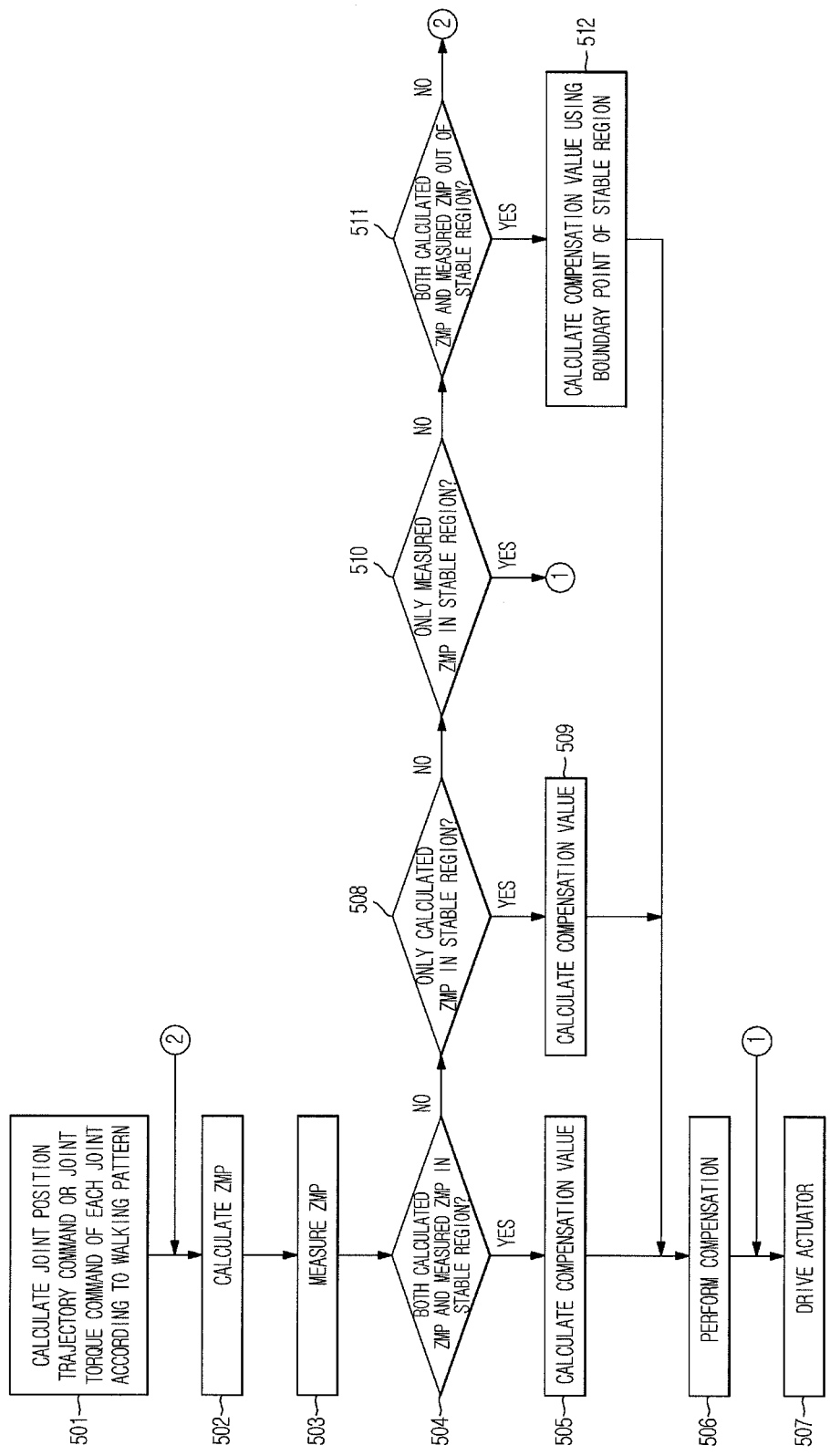
FIG. 8 illustrates a walking control method of a humanoid robot according to an embodiment.

Referring to FIG. 8, a walking control method of the humanoid robot according to an embodiment will be described.

The walking pattern creation unit 300 creates a walking pattern such that the humanoid robot 100 walks based on an FSM. At this time, the joint position trajectory calculator 303 of FIG. 5 determines the landing state of the humanoid robot 100 to calculate a joint position trajectory command of each joint of the robot joint unit 330 such that each joint is moved according to the walking pattern, or the joint torque calculator 304 of FIG. 6 calculates a joint torque command using the joint position trajectory command as represented by Equation 1 (501). As another example to create the joint position trajectory command, motion of a human may be captured, and motion of each joint may be sampled in a cycle, and joint positions of the humanoid robot are matched based on the sampling information to calculate the joint position trajectory command.

Upon receiving the trajectory of each joint from the walking pattern creation unit 300, the ZMP calculation unit 340 calculates a calculated ZMP (Pxc, Pyc) from a mass model of the robot as represented by Equation 2 and provides the calculated ZMP to the compensation value calculation unit 350 (502).

Information measured by the multi-axis F/T sensor 24 and the pose sensor 14 of the sensor unit 370 is provided to the ZMP measurement unit 360. The ZMP measurement unit 360 calculates a measured ZMP (Pxm, Pym) according to Equation 3 using the value measured by the sensor unit 370 and provides the calculated measured ZMP to the compensation value calculation unit 350 (503).

When both the calculated ZMP and the measured ZMP are located in the stable region 402 (YES of 504), no operation may be performed to balance the robot, but compensation may be performed considering the occurrence of an unstable situation. To this end, the compensation value calculation unit 350 calculates a compensation value using the calculated ZMP provided from the ZMP calculation unit 340 and the measured ZMP provided from the ZMP measurement unit 360. For example, a compensation value of an x-axis coordinate of a joint to be compensated for may be a value $k_{px}(p_{xc}-p_{xm})$ obtained by taking the product of a difference between the calculated ZMP and the measured ZMP and a proportional gain $k_{px}$ and a value $k_{px}(p_{xc}-p_{xm})$ obtained by taking the product of a difference between a derivative calculated ZMP and a derivative measured ZMP and a derivative gain $k_{dx}$ (505).

The compensation unit 310 adds a compensation value calculated by the compensation value calculation unit 350 to an original joint position trajectory command calculated by the joint position trajectory calculator 303 to compensate for a joint position trajectory command and provides the compensated joint position trajectory command to the actuator drive unit 320. Alternatively, the compensation unit 310 may add a compensation value calculated by the compensation value calculation unit 350 to an original joint torque command calculated by the joint torque calculator 304 to compensate for a joint torque command and provide the compensated joint torque command to the actuator drive unit 320 (506).

The actuator drive unit 320 drives the actuator mounted to each joint of the robot joint unit 330 according to the joint position trajectory command compensated for by the compensation unit 310 or the joint torque command compensated for by the compensation unit 310. As shown in FIG. 7A, therefore, the measured ZMP ○ moves in the arrow direction to follow the calculated ZMP ● (507).

Since the robot is stable based on criteria according to the walking pattern of the robot but, in actuality, the robot is unstable due to floor conditions of a walking surface, a modeling error, a control error, etc., the calculated ZMP may be located in the stable region 402 and the measured ZMP may be located out of the stable region 402, as shown in FIG. 7B (YES of 508). At this time, the compensation value calculation unit 350 calculates a compensation value using the calculated ZMP provided from the ZMP calculation unit 340 and the measured ZMP provided from the ZMP measurement unit 360 (509). The compensation unit 310 compensates for the joint position trajectory command or the joint torque command using the compensation value (506). The compensation unit 310 provides the compensated joint position trajectory command or the compensated joint torque command to the actuator drive unit 320, and the actuator drive unit 320 drives the actuator, such as the motor, mounted to each joint of the robot joint unit 330 such that the actuator follows the compensated joint position trajectory command or the compensated joint torque command (507). As shown in FIG. 7B, therefore, the measured ZMP ○, which is located out of the stable region 402, moves in the arrow direction to follow the calculated ZMP ●, which is located in the stable region 402.

During walking of the robot, the calculated ZMP may be located out of the stable region 402 and the measured ZMP may be located in the stable region 402, as shown in FIG. 7C (YES of 510). This means that the robot is unstable based on criteria according to the walking pattern of the robot but, in actuality, the robot is stable. In this case, compensation using a compensation value is not performed to balance the robot.

During walking of the robot, both the calculated ZMP and the measured ZMP may be located out of the stable region 402, as shown in FIG. 7D (511). In this case, a stable state is not secured although the measured ZMP follows the calculated ZMP, since the calculated ZMP is located out of the stable region 402. Therefore, a compensation value is calculated using the boundary point A of the stable region 402 nearest the position of the calculated ZMP ● (512). The compensation unit 310 compensates for a joint position trajectory command or a joint torque command using the compensation value obtained using the boundary point A and provides the compensated joint position trajectory command or the compensated joint torque command to the actuator drive unit 320 (506). The actuator drive unit 320 drives the actuator mounted to each joint of the robot joint unit 330 such that the actuator follows the compensated joint position trajectory command or the compensated joint torque command (507). As shown in FIG. 7D, therefore, the measured ZMP ○, which is located out of the stable region 402, moves in the arrow direction such that the measured ZMP ○ is located in the stable region 402.

As is apparent from the above description, the humanoid robot and the walking control method thereof servo-control the motor torque through the FSM-based walking control. During walking, therefore, the position of each joint may not be correctly controlled, thereby achieving walking with a low servo gain, thus reducing energy consumption. Also, each joint has low rigidity during walking, and therefore, impact applied to each joint is reduced upon colliding with obstacles. In addition, knee-stretching walking, which is difficult in a conventional walking method solving inverse kinematics, is performed, thereby achieving human-friendly walking and saving energy related to knee bending. Also, complex dynamics may not be solved, thereby achieving application to a robot including joints having six degrees of freedom.

Although a few embodiments have been shown and described, it would be appreciated by those skilled in the art that changes may be made in these embodiments without departing from the principles and spirit of the embodiments, the scope of which is defined in the claims and their equivalents.

What is claimed is:

1. A humanoid robot, comprising:
    a robot joint unit comprising joints movable during walking of the robot;
    a sensor unit to measure landing information and pose information of the robot;
    a walking pattern creation unit to calculate a joint position trajectory command or a joint torque command of each joint to perform walking of the robot according to a walking pattern of the robot;
    a zero moment point (ZMP) calculation unit to output a calculated ZMP of the robot calculated using a trajectory of each joint calculated by the walking pattern creation unit;
    a ZMP measurement unit to output a measured ZMP of the robot measured using a measurement value of the sensor unit;
    a compensation value calculation unit to calculate and output a compensation value to compensate for the joint position trajectory command or the joint torque command using the calculated ZMP calculated by the ZMP calculation unit and the measured ZMP calculated by the ZMP measurement unit; and
    a compensation unit to add the compensation value calculated by the compensation value calculation unit to the joint position trajectory command or the joint torque command calculated by the walking pattern creation unit to compensate for the joint position trajectory command or the joint torque command,
    wherein the walking pattern creation unit comprises a plurality of state machines alternately operating when a left foot or a right foot lands on a ground to perform walking and a joint position trajectory calculator to determine landing of the left foot or the right foot to perform walking according to switching between the state machines to calculate a joint position trajectory command of each joint to perform walking.

2. The humanoid robot according to claim 1, wherein the walking pattern creation unit further comprises a joint torque calculator to calculate a joint torque command using the joint position trajectory command.

3. The humanoid robot according to claim 2, wherein the joint torque calculator calculates a joint torque command $\tau_d$ of each joint as represented by Equation 1

$$\tau_d = k_p(\theta_d - \theta) + k_d(\dot{\theta}_d - \dot{\theta}) + \tau_{ff} \qquad \text{Equation 1}$$

where, $\theta_d$ is a joint position trajectory command, $\theta$ is a current joint position fed back from an actuator such as a motor, $k_p$ is a proportional gain, $\dot{\theta}_d$ is a derivative joint position trajectory command, $\dot{\theta}$ is a derivative current joint position, $k_d$ is a derivative gain, and $\tau_{ff}$ is a feed-forward parameter previously calculated using inverse dynamics.

4. The humanoid robot according to claim 1, wherein the ZMP calculation unit calculates a calculated ZMP (Pxc, Pyc) from a mass model of the robot as represented by Equation 2, $$p_{xc} = \frac{\sum_{i=1}^{N} \{m_i(\ddot{z}_i + g)x_i - m_i(z_i - p_z)\ddot{x}_i + (0, 1, 0)I_i\dot{\omega}_i\}}{\sum_{i=1}^{N} m_i(\ddot{z}_i + g)} \qquad \text{Equation 2}$$

$$p_{yc} = \frac{\sum_{i=1}^{N} \{m_i(\ddot{z}_i + g)y_i - m_i(z_i - p_z)\ddot{y}_i + (0, 1, 0)I_i\dot{\omega}_i\}}{\sum_{i=1}^{N} m_i(\ddot{z}_i + g)}$$

where, N is a number of F/T sensors, $m_i$ is a mass of an $i^{th}$ link of the robot, $\ddot{x}_i$, $\ddot{y}_i$ and $\ddot{z}_i$ are accelerations of a center of gravity of the $i^{th}$ link of the robot in x-axis, y-axis, and z-axis directions, $I_i$ is a moment of inertia of the $i^{th}$ link of the robot, $\dot{\omega}_i$ is acceleration of the $i^{th}$ link of the robot, g is acceleration due to gravity, and (0,1,0) is a 3-by-1 matrix.

5. The humanoid robot according to claim 1, wherein the ZMP measurement unit measures a measured ZMP (Pxm, Pym) of the robot using the measurement value of the sensor unit as represented by Equation 3, $$p_{xm} = \frac{\sum_{i=1}^{N} \{-\tau_{iy} - (p_{iz} - p_z)f_{ix} + p_{ix}f_{iz}\}}{\sum_{i=1}^{N} f_{iz}} \qquad \text{Equation 3}$$

$$p_{ym} = \frac{\sum_{i=1}^{N} \{\tau_{ix} - (p_{iz} - p_z)f_{iy} + p_{iy}f_{iz}\}}{\sum_{i=1}^{N} f_{iz}}$$

where, N is a number of F/T sensors, $p_{ix}$, $p_{iy}$ and $p_{iz}$ are x-axis, y-axis and z-axis reference positions when force is measured by an $i^{th}$ F/T sensor, $p_z$ is a z-axis coordinate of the ZMP, $\tau_{ix}$ and $\tau_{iy}$ are x-axis and y-axis moments of the $i^{th}$ F/T sensor, and $f_{ix}$, $f_{iy}$ and $f_{iz}$ are x-axis, y-axis and z-axis forces of the $i^{th}$ F/T sensor.

6. The humanoid robot according to claim 1, wherein the compensation value calculation unit calculates the compensation value using the calculated ZMP and the measured ZMP and outputs a value obtained by taking a product of a difference between a calculated ZMP and a measured ZMP of a joint to be compensated for and a proportional gain and a value obtained by taking a product of a difference between a derivative calculated ZMP and a derivative measured ZMP and a derivative gain as the compensation value.

7. The humanoid robot according to claim 1, wherein the compensation unit performs compensation based on situations divided according to a position of the calculated ZMP and a position of the measured ZMP in a stable region of the robot.

8. A walking control method of a humanoid robot, comprising:
calculating a joint position trajectory command and/or a joint torque command of each joint to perform walking of the robot according to a walking pattern of the robot;
calculating a calculated zero movement point (ZMP) of the robot using a trajectory of each joint calculated according to the walking pattern;
measuring a measured ZMP of the robot using a measurement value measured by a sensor mounted in the robot;
calculating, using a processor, a compensation value to compensate for the joint position trajectory command or the joint torque command using the calculated ZMP and the measured ZMP; and
compensating for the joint position trajectory command and/or the joint torque command using the compensation value,
wherein the walking pattern creation unit comprises a plurality of state machines alternately operating when a left foot or a right foot lands on a ground to perform walking and a joint position trajectory calculator to determine landing of the left foot or the right foot to perform walking according to switching between the state machines to calculate a joint position trajectory command of each joint to perform walking.

9. The walking control method according to claim 8, wherein calculating the compensation value comprises obtaining a product of a difference between a calculated ZMP and a measured ZMP of a joint to be compensated for and a proportional gain and a product of a difference between a derivative calculated ZMP and a derivative measured ZMP and a derivative gain.

10. The walking control method according to claim 8, wherein compensating for the joint position trajectory command or the joint torque command comprises performing compensation based on situations divided according to a position of the calculated ZMP and a position of the measured ZMP in a stable region of the robot.

11. The walking control method according to claim 10, wherein the compensation is performed to move the measured ZMP such that the measured ZMP follows the calculated ZMP when both the calculated ZMP and the measured ZMP are located in the stable region.

12. The walking control method according to claim 10, wherein the compensation is performed to move the measured ZMP such that the measured ZMP follows the calculated ZMP when the calculated ZMP is located in the stable region and the measured ZMP is located out of the stable region.

13. The walking control method according to claim 10, wherein the compensation is not performed when the calculated ZMP is located out of the stable region and the measured ZMP is located in the stable region.

14. The walking control method according to claim 10, wherein the compensation is performed using a compensation value calculated using a boundary point of the stable region nearest the position of the calculated ZMP when both the calculated ZMP and the measured ZMP are located out of the stable region.

* * * * *